Nov. 5, 1935.　　　T. S. AYERS　　　2,020,012

LIQUID METER

Filed Nov. 5, 1930

Inventor
Theodore S. Ayers
per James B. Lewis
Attorney

Patented Nov. 5, 1935

2,020,012

UNITED STATES PATENT OFFICE 2,020,012

LIQUID METER

Theodore S. Ayers, St. Louis, Mo., assignor to Republic Flow Meters Company, Chicago, Ill., a corporation of Illinois Application November 5, 1930, Serial No. 493,508

17 Claims. (Cl. 73—37)

This invention relates to fluid meters and more particularly to liquid meters.

One application of the present invention is in connection with the measurement of water resulting from the condensation of steam. The invention is particularly designed for use in plants where steam is generated for power and heating purposes and it is this application which is illustrated and described. It is to be understood, however, that this is only by way of example and that liquids other than condensates may be measured with equal facility.

The present invention is an improvement over the one for which Letters Patent of the U. S. were granted to me August 26, 1919, No. 1,314,039.

The principal objects of the present invention are in general the same as those of the above patent with the addition of those below enumerated.

The principal object of the present invention is to provide a new and improved measuring rotor having increased capacity and accuracy.

Another object of the invention is to provide a rotor with new and improved discharge outlets for the measuring compartments thereof which permit rapid discharge of the measured liquid from the measuring compartments.

Still another object of the invention is to provide a new and improved diffuser for directing the incoming liquid into the proper measuring compartment of the rotor and which precludes the liquid impinging directly against the rotor, that is, any jet action of the incoming liquid is diffused and the liquid caused to gravitate to the measuring compartment.

Further objects of the invention are to provide a fluid meter of extreme accuracy and to maintain the same degree of accuracy for both large and small rates of flow, and to provide a meter that can be built practically in any size, that operates on low pressures, that is, simple, durable, efficient, and economical to install.

Other objects will be apparent from the following description taken in connection with the accompanying drawing in which an exemplary embodiment of the invention is illustrated.

Figure 1:
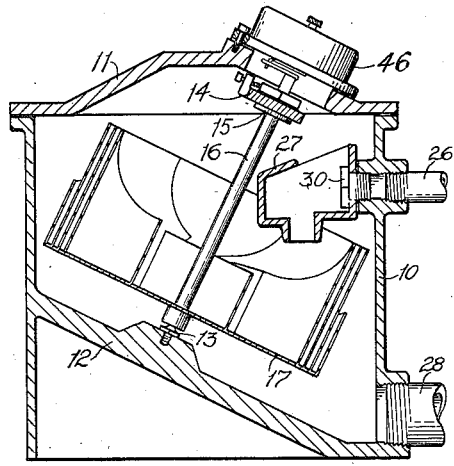
Figure 1 is a vertical central section through the center of the meter.
Figure 2:
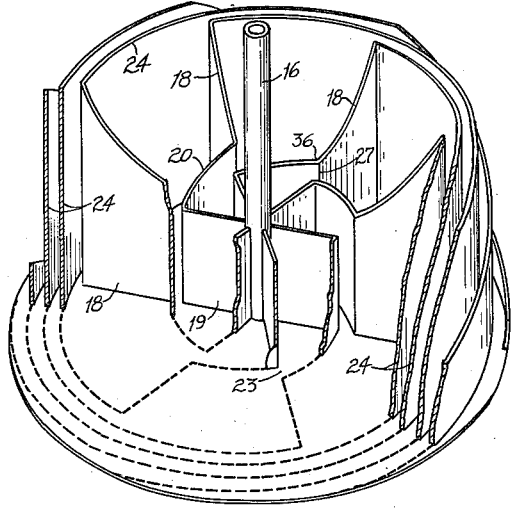
Figure 2 is a perspective of the measuring rotor with certain parts broken away to more clearly illustrate the construction thereof.

Referring to the exemplary embodiment of the invention illustrated, number 10 designates a suitable casing or housing for the measuring rotor and removably positioned on the top thereof is a suitable cover plate 11. The casing is provided with a bottom 12, which, in the illustration, is inclined at an angle of approximately 25° or 30° with respect to a horizontal plane. As a matter of convenience, it is preferable to incline the bottom since it provides a strong support for the bearing upon which the rotor spindle rests and also facilitates the draining of the liquid from the casing to the outlet pipe.

Arranged on the bottom of the housing is a bearing 13 and arranged across the top of the casing is a bridge or arm 14 in which a suitable antifriction bearing 15 is mounted. Rotatably mounted in the bearing 15 with its lower end carried by the bearing 13 is a shaft 16 upon which the measuring rotor is positioned. The upper end of the shaft 16 carries a recording mechanism 46 comprising a dial and an indicator whereby the revolutions of the measuring rotor are recorded. This measuring rotor comprises a bottom plate 17 and a series of substantially radially arranged partitions disposed upon said plate. These partitions include an outer portion 18 and an inner portion 19 and an intermediate portion 20.

The outer portion 18 is in the form of a plate or wall which is set in from the periphery of the plate 17 and extends radially inwards towards the spindle of the rotor and the upper edge of this outer wall portion is inclined downwardly towards the axis of the rotor so that this upper edge occupies a plane at an angle of approximately 25° or 30° with respect to the plane occupied by the bottom plate 17. The upper edge may be curved as shown in Figure 1, the exact contour being an empirical function of the capacity for which the meter is designed, but always retaining approximately the angle of 25° to 30° with respect to the bottom plate 17. The inner portion 19 of each partition extends radially outward from the shaft 16 and occupies a vertical or upright position at an angle of approximately 60° with respect to the corresponding plane occupied by the outer portion 18 of the partition.

The upper edge of the inner wall portion occupies a plane substantially parallel with the plane occupied by the bottom plate 17 and is approximately one-half the height of the outer edge of the outer wall portion 18.

The adjacent ends of the portions 18 and 19 are connected by an intermediate portion 20, which is curved slightly throughout its length so that it occupies a position slightly eccentric to the shaft 16. The upper edge of this intermediate portion 20 declines gradually from the outer wall 18 to the inner wall 19. The upper edge of the intermediate wall forms a continuation of the upper edge of the outer wall 18 and the inclination thereof may be approximately the same as that of the outer wall portion. Due to this arrangement of the members forming each partition, the lowest point on the upper edge of each partition is at the point where the upper edge of the intermediate portion 20 joins the upper edge of the inner member 19. In view of this, the upper edge of each partition inclines upwardly in both directions from this point.

By virtue of the construction and arrangement of the partitions above described, the measuring rotor is formed with a series of open topped measuring compartments, each of which comprises a relatively large outer chamber 21 and a smaller inner chamber 22 interconnected by a relatively narrow passage 23, the latter being formed between the inner end or edge of the outer member 18 of one partition and the outer end or edge of the inner member 19 of the next adjacent partition. The outer portion of the chamber 21 is formed by a wall or extension 24 connected with the outer edge of outer member 18.

This wall 24 is curved throughout its length so that it occupies a position slightly eccentric to the shaft 16 and extends for a distance of approximately 240° around the periphery of the plate 17. The top and bottom edges of this wall 24 are parallel to each other for substantially half the length of the wall, while the remaining part of the wall declines gradually to a point which terminates adjacent the periphery of the plate 17. In view of the fact that there are a number of these walls, that is, one for each measuring receptacle of the rotor, portions of the walls overlap each other and form therebetween discharge outlets 25 for the respective measuring chambers. The discharge outlet for each chamber is relatively narrow and of a depth substantially equal to that of the measuring chamber at its point of communication therewith. The sloping portion of the outer wall provides a dam or weir over which the water discharges during rotation of the rotor and thereby provides a very convenient and efficient outlet for emptying the measuring compartments.

The liquid to be measured is conducted to the meter through an inlet pipe 26 discharging into a diffuser 27 which functions to break up the jet action of the condensate and vapor and permits the liquid to discharge therefrom by gravity into the lowermost portion of the lower one of the measuring compartments 21. After the liquid has been measured by the measuring compartment it is discharged therefrom into the casing 10 and is conducted away thru a discharge pipe 28.

As above stated, the purpose of the diffuser is to eliminate the possibility of the jet action of the liquid impinging upon the rotor thereby causing the same to spin. In the measurement of condensate it often happens that portions of the fluid, such as steam, pass thru the pipe without condensing and it is one purpose of the diffuser to prevent this fluid from impinging against the rotor. A top portion of the diffuser is open so that any vapor passing thru the inlet pipe into the diffuser will be intercepted and permitted to pass upwardly away from the rotor into the casing 10, where it may either condense or find its way out thru the discharge pipe 28.

Figure 4:
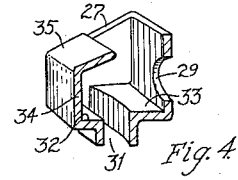
Figure 4 is a perspective sectional view of the diffuser illustrated in Figure 1.

The diffuser, Figs. 1 and 4, has an opening 29 in one wall for the reception of a hollow screw 30 which holds the diffuser in position, adjacent the inlet pipe. An outlet 31 having a depending flange, divides the bottom of the diffuser into two portions, the front portion 32 of which is on a plane slightly below the plane of the other portion 33 so that the liquid will impinge against the wall 34, expend its force thereagainst and discharge by gravity through the outlet and into the measuring rotor. The outlet may be and is slightly arcuate and the liquid, which impacts against wall 34, is prevented from spilling over the sides by the top 35.

The operation of the device thus far described is as follows:

The liquid of condensation or water to be measured is delivered thru the inlet pipe 26 into the diffuser and discharged through outlet 31 thereof into the lowermost one of the outer compartments 21 and the water will rise in this compartment until it reaches the overflow level. When this level has been reached the water will begin to overflow at the point 36 into the next adjacent left hand compartment or in the portion 22 of said compartment. This overflow of water into the next adjacent compartment passes thru the space 23 into the larger portion 21 of said next adjacent compartment. The water is prevented from overflowing into the adjacent right hand compartment because all portions of the partition wall are higher than the lowest point 36 on the partition between the adjacent left hand compartment.

As the overflow gradually increases to the next adjacent left hand compartment, the weight of the increasing volume of water in said compartment will tend to rotate the measuring member, in which the compartments are formed, in a counter-clockwise direction until finally the next adjacent left hand compartment, into which the water has been overflowing, is brought into position to receive the water directly from the diffuser 27 and as the flow of the water continues, it will rise in this filling compartment until it overflows at the low point 36 on the upper edge of the next adjacent left hand partition. This successive filling of the compartments and overflow from one compartment to another will continue as long as the flow of water thru the inlet pipe 26 continues.

During the filling of each compartment the water stands at the same level in the outlet passages 25, formed between adjacent wall portions 24, as in the measuring compartments 21 and 22. Shortly after the measuring compartments 21 and 22 have been filled, and moved out of registry with the diffuser 27, the water in the passages will begin to discharge over the inclined portion of the extension wall 24 and into the casing 10. This sloping portion of the wall is arranged so that once the water begins to discharge from the passages 25, it spills over the greater portion of this length thereby emptying the compartments very quickly. This rapid emptying of the measuring compartments, after they have been filled, is an important feature of the invention and especially distinguishes the present invention from the previous one herein mentioned and also from every other meter of which I am aware.

The theory upon which the operation of the present invention depends is that the weight of the liquid confined by the rotor is continuously being transferred to the left hand side of the rotor thereby rotating said rotor. More specifically, as the water discharges into the lowermost measuring compartment of the rotor the weight thereof gradually increases, and by virtue of the arrangement of the compartments and outlet passages therefor, the weight slowly shifts to the left across said compartment to revolve the rotor. When the compartment is filled, the water overflows into the next adjacent left hand compartment, and the weight of this water gradually shifts further to the left thereby further rotating the rotor in a counter-clockwise direction.

Figure 3:
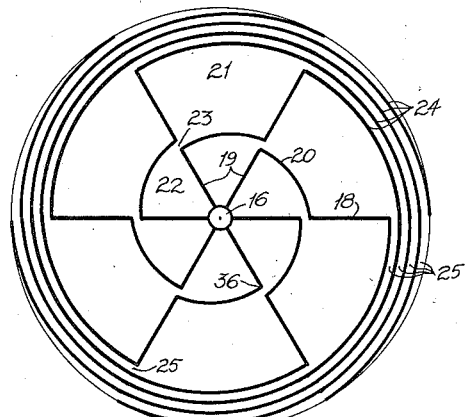
Figure 3 is a plan view of the measuring rotor.

This shifting of the weight continues from one compartment to the other and as the filled compartment moves upwardly and to the right in response to the increasing weight of the liquid in the next adjacent left hand compartment, the weight of the liquid in the first filled compartment begins to diminish by reason of the discharge of the liquid from this compartment and this decrease in weight continues until the end of the discharge passage 25 for that compartment passes the point 37, Fig. 3, thereby completing emptying of the compartment.

For accuracy in any rotary volumetric meter of which the present invention is an outstanding type, it is important that the measuring compartments be filled to the same extent during the successive filling and emptying cycles, that is, the liquid must be permitted to fill the measuring compartment and thereafter be definitely cut off. For accuracy at maximum capacity the cycles must not overlap. This means that the filling and emptying operations must be definite and precise so that the same quantity will be measured off in each compartment. These requirements for accuracy and capacity in a liquid meter are met in an eminent degree in the present invention.

The position of the diffuser is such that the liquid discharging therefrom into the measuring compartments is initiated and discontinued at the proper time. This is accomplished by properly arranging the outlet opening 31 from the diffuser so that the liquid discharging therefrom will not discharge into an approaching empty compartment until after the filling compartment has been completely filled, that is, the filling compartment first fills and then overflows into the approaching empty compartment before the liquid from the diffuser begins to discharge directly into the approaching empty compartment.

Figure 5:
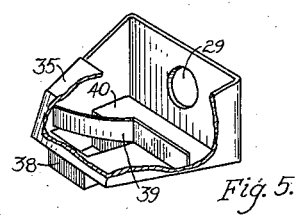
Figure 5 is a perspective view with parts broken away of a modified form of diffuser.
Figure 6:
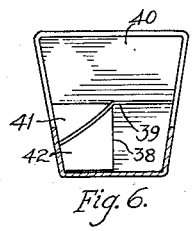
Figure 6 is a plan view of the diffuser illustrated in Figure 5.

In the modified form of diffuser shown in Figs. 5 and 6, the outlet opening 38 is arranged adjacent one side thereof so that the liquid discharged therethrough will be directed into the filling compartment thereby insuring the proper filling of this compartment. By off-setting the discharge outlet to the right and in the direction of rotation of the rotor, complete filling of the compartments is insured because a greater quantity of overflow from the filled compartment is necessary to shift the compartment from beneath the outlet 38. To further assure complete filling of the compartments during the filling operation, a baffle 39 is positioned on the floor 40 of the diffuser to divert the liquid to the right hand portion 41 of the outlet opening. At small flows the baffle 39 diverts all of the water thru the outlet portion 41, while at larger flows the liquid pours over this dam and discharges also thru the portion 42 of the outlet opening.

Figure 7:
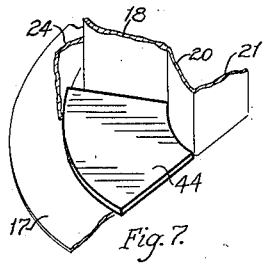
Figure 7 is a perspective of a measuring compartment of the rotor with a counter-balancing weight therein.

The rotor is nicely balanced and arranged to rotate in response to the weight of the liquid therein and there may be occasions when the flow of the liquid is uneven as when the liquid collects in the pipe system, of which the meter is a part, and is expelled therefrom into the meter in slugs or gulps. This sudden increase in flow above the then normal flow, may initiate a spinning action of the rotor and to eliminate this spinning tendency, the rotor may be slightly overbalanced at one portion. This may be accomplished by adding weight to one portion of the rotor, preferably by placing a weight 44 of light weight material in or on the underside of one of the measuring compartments as in Fig. 7. This weight, even though it be very small, overbalances one side of the rotor and thereby eliminates any spinning tendency. While it might appear that over-balancing of a portion of the rotor would cause inaccurate measurement of the liquid, this is not the case. One explanation of this unusual phenomena is that while the compartments on the side of the rotor opposite the compartment containing the disc may slightly underfill because the weight of the disc causes them to move away from the discharge outlet before completely filling, those compartments adjacent the overbalanced portion will slightly overfill, that is, the meniscus of the liquid in these compartments will be of sufficient height to cause said compartments to overfill and thereby make up for any underfilling of the other compartments. In other words, while some of the compartments may slightly underfill, the other compartments overfill and there is thus a balancing of the liquid in the compartments insuring the accuracy of the device. The diffuser and overbalanced rotor are important features and distinguish the present invention from the previous one above mentioned and from every other meter of which I am aware.

The quantity of liquid passing thru the metering device may be indicated by suitable registering mechanism 44 preferably mounted on the cover 11 and operated by the shaft 16 of the rotor. Since the capacity of each measuring compartment is known, the reading of the register may be calibrated to read directly the volume of water or other fluid passing thru the meter.

It will be seen that with the construction illustrated and described, a very simple yet effective form of device is presented and it is to be understood that I do not wish to be limited by the exact embodiment of the device shown, which is merely by way of illustration and not limitation, as various and other forms of the device will, of course, be apparent to those skilled in the art.

What I claim is:

1. A meter comprising a casing having inlet and outlet openings, a receptacle mounted in said casing for rotation in an inclined plane, and including partitions dividing said receptacle into a plurality of measuring compartments and means forming outlets for each compartment, said outlets being of substantially the same depth as that of the measuring compartments and a diffuser communicating with the inlet for supplying liquid to said receptacle, said diffuser adapted to break up the jet action of the incoming liquid and discharge the same by gravity into the compartments.

2. A meter comprising a casing having inlet and outlet openings, a rotor mounted in said casing for rotation in an inclined plane, and including partitions dividing said rotor into a series of compartments, each partition comprising inner and outer offset portions and an intermediate portion connecting the adjacent ends of said first named portions, said rotor also including an extension connected with each outer portion and of substantially the same height as said portion at its point of connection therewith, said extensions arranged in overlapping relation throughout a portion of their length for defining discharge passages for said measuring compartments and means communicating with the inlet opening for directing the liquid to the measuring compartments.

3. A liquid meter comprising a casing provided with inlet and outlet openings, a rotor mounted in said casing for rotation in an inclined plane and provided with a plurality of measuring compartments, a diffuser communicating with the inlet opening, said diffuser provided with an opening in the bottom thereof for directing the incoming liquid by gravity into the measuring compartments and means in said diffuser for directing a portion of the liquid thru a part only of said discharge opening.

4. A measuring rotor mounted for rotation in a plane slightly inclined with respect to the horizontal and comprising a plate, partitions arranged thereon for forming a plurality of measuring compartments, said partitions being arranged so that fluid delivered into the lowermost one of the compartments and rising therein will overflow into one of the next adjacent compartments, and an extension from the outer end of each of the partitions and arranged in overlapping relation throughout a portion of their length to form discharge passages for each of said measuring compartments, the upper edge of each of said portions being of substantially the same depth as said partitions, when each of said portions is discharging water from its corresponding partition.

5. A measuring receptacle mounted for rotation in an inclined plane and comprising a bottom wall, partitions arranged on said wall and defining therewith measuring compartments, each partition comprising offset inner and outer portions and an intermediate portion connecting the adjacent ends of said inner and outer portion, extensions connected with the outer end of the outer portion and extending around a plurality of compartments, said extensions overlapping each other throughout a portion of their length and defining outlet passages for the respective measuring compartments, said passages being of substantially the same depth as the compartments with which they communicate.

6. A measuring rotor comprising a circular bottom wall adapted to be mounted on a shaft for rotation in an inclined plane, partitions mounted on said bottom wall including offset inner and outer radially extending portions and intermediate portions connecting the adjacent ends of said inner and outer portions, said outer portions terminating short of the periphery of the bottom wall and outer walls connected at one end with the outer end of the outer member and extending partially around the bottom wall adjacent the periphery thereof, said outer walls being curved throughout their length with the ends thereof terminating at the periphery of the bottom wall.

7. A measuring rotor comprising a circular bottom plate adapted to be mounted on a shaft for rotation in an inclined plane, partitions mounted on said plate for forming therewith measuring receptacles, said partitions comprising inner and outer offset radially extending portions and an intermediate portion connecting the adjacent ends of said inner and outer portions, the top edge of the inner portion being parallel with the bottom plate, the outer and intermediate portions being of greater height than that of the inner portion and sloping towards the outer end of the inner portion, said outer portion terminating short of the periphery of the disc and an outer wall connecting with the end thereof extending around and overlapping a plurality of the measuring compartments, the top edge of said outer wall being parallel with the bottom plate for substantially half its length and gradually declining to said plate for the remaining portion of its length.

8. A measuring receptacle mounted for rotation in an inclined plane, and comprising an annular bottom wall, partitions arranged on said wall and forming a series of compartments, each comprising an inner chamber and an outer chamber, said chambers being offset with respect to each other and the upper edge of each partition being provided with portions which are inclined with respect to each other and walls forming discharge outlets for each of said outer chambers, said walls being of the same depth as the chambers for substantially half their length and being inclined to said disc for the remaining portion of their length.

9. A diffuser comprising end, side, and bottom walls forming a receptacle, there being an inlet opening in one end wall and a discharge opening in the bottom wall and means extending across said outlet opening for diverting the liquid at small flows thru a portion only of said discharge opening.

10. A diffuser comprising a receptacle having a substantially horizontal inlet in one wall thereof and an outlet in its bottom remote from said inlet and a cover partially enclosing the top thereof above said outlet opening the top adjacent said inlet being open, said outlet opening being located adjacent one of the side walls of said receptacle.

11. A diffuser comprising a receptacle having an inlet opening in one wall thereof and an outlet opening in its bottom and a cover partially closing the top of said receptacle remote from said inlet opening, and a baffle in said receptacle, said baffle extending across said opening for diverting the liquid thru a portion only of said outlet opening at small flows.

12. A normally balanced rotor mounted for rotation in an inclined plane and comprising a plurality of measuring compartments and means overbalancing one portion of said rotor.

13. A measuring receptacle comprising a plurality of measuring compartments, each including an inner and outer chamber offset relative to each other and a weight located in one of said compartments for over-balancing the receptacle.

14. A measuring rotor mounted for rotation in an inclined plane and comprising a bottom wall, partitions arranged on said wall and consisting of two radially disposed sections joined together by a curved section and peripheral walls connected with the outer ends of said partitions, each of said peripheral walls extending around a plurality of said compartments in overlapping relation with the peripheral wall corresponding to the adjacent compartment for defining therewith outlet passages for the respective measuring compartments.

15. A measuring rotor mounted for rotation in an inclined plane and comprising a bottom plate, and partitions mounted on said plate and consisting of two radially disposed sections joined together by a curved section and having extension walls from the outer ends thereof which extend partially around said plate, said extensions being of substantially the same height as the outer ends of the partitions for a portion of their length and then declining downwardly to said plate for defining outlet passages for the respective measuring compartments.

16. A meter comprising a measuring receptacle having a plurality of measuring compartments, and means for supplying liquid to said measuring compartments, said means including a diffuser head having a substantially horizontal inlet adapted to discharge against a substantially vertical wall, a cover over said diffuser head adjacent said wall leaving a vent in the upper portion of said diffuser head adjacent the inlet and larger than the inlet, and a bottom discharge outlet larger than said inlet and arranged above to discharge into said compartments, said diffuser head being mounted above and spaced from said compartments and adapted to dissipate the velocity of the incoming liquid and discharge said liquid into the compartments substantially with a gravity head.

17. A meter comprising a measuring receptacle having a plurality of measuring compartments, each compartment including inner and outer radially displaced chambers offset with respect to each other, and means for supplying liquid to said measuring compartments, said means including a diffuser head having a substantially horizontal inlet adapted to discharge against a substantially vertical wall, a cover over said diffuser head adjacent said wall leaving a vent in the upper portion of said diffuser head adjacent the inlet and larger than the inlet, and a bottom discharge outlet larger than said inlet and arranged directly above to discharge into said outer chambers, said diffuser head being mounted above and spaced from said compartments and adapted to dissipate the velocity of the incoming liquid and discharge said liquid into the compartments substantially with a gravity head.

THEODORE S. AYERS.